(12) United States Patent
Mueller et al.

(10) Patent No.: US 6,806,235 B1
(45) Date of Patent: Oct. 19, 2004

(54) LUBRICANTS FOR DRILLING FLUIDS

(75) Inventors: Heinz Mueller, Monheim (DE);
Claus-Peter Herold, Mettmann (DE);
Frank Bongardt, Meerbusch (DE);
Nadja Herzog, Erkrath (DE); Stephan von Tapavicza, Erkrath (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/856,082

(22) PCT Filed: Nov. 6, 1999

(86) PCT No.: PCT/EP99/08532
§ 371 (c)(1),
(2), (4) Date: Aug. 24, 2001

(87) PCT Pub. No.: WO00/29502
PCT Pub. Date: May 25, 2000

(30) Foreign Application Priority Data

Nov. 17, 1998 (DE) .......................... 198 52 971

(51) Int. Cl.⁷ ................................. C09K 7/02
(52) U.S. Cl. ...................... 507/138; 507/139
(58) Field of Search ................. 507/138, 139

(56) References Cited

U.S. PATENT DOCUMENTS

| | | | |
|---|---|---|---|
| 3,979,305 A | * | 9/1976 | Fischer et al. ............. 507/138 |
| 3,989,632 A | * | 11/1976 | Fischer et al. ............. 507/138 |
| 4,192,753 A | * | 3/1980 | Pye et al. .................. 507/138 |
| 4,409,108 A | * | 10/1983 | Carney et al. ............. 507/138 |
| 4,964,615 A | | 10/1990 | Mueller et al. |
| 5,194,422 A | | 3/1993 | Mueller et al. |
| 5,232,910 A | | 8/1993 | Mueller et al. |
| 5,250,204 A | | 10/1993 | Karn et al. |
| 5,252,554 A | | 10/1993 | Mueller et al. |
| 5,318,954 A | | 6/1994 | Mueller et al. |
| 5,318,956 A | * | 6/1994 | Mueller ...................... 507/138 |
| 5,348,938 A | | 9/1994 | Mueller et al. |
| 5,403,822 A | | 4/1995 | Mueller et al. |
| 5,441,927 A | | 8/1995 | Mueller et al. |
| 5,461,028 A | | 10/1995 | Mueller et al. |
| 5,869,434 A | | 2/1999 | Mueller et al. |
| 6,022,833 A | | 2/2000 | Mueller et al. |
| 6,211,119 B1 | | 4/2001 | Herold et al. |

FOREIGN PATENT DOCUMENTS

| | | |
|---|---|---|
| AU | 717973 | 6/1998 |
| DE | 34 19 415 | 11/1985 |

(List continued on next page.)

OTHER PUBLICATIONS

Agenda for the seminar on "The Prevention of Oil Discharge from Drilling Operations," held in public in Aberdeen on Jun. 18–19, 1996 (organized by IBC Technical Services, London).

M. Eigner, "Field Trials with Silicate Base Mud: A New Water Base Mud System", pp. 1–12, Prepared for the 1996 Conference on Prevention of Oil Discharge to the Sea, held in public in Aberdeen on Jun. 18–19, 1996 (organized by IBC Technical Services, London).

(List continued on next page.)

Primary Examiner—Philip C. Tucker
(74) Attorney, Agent, or Firm—John E. Drach; Steven J. Trzaska

(57) ABSTRACT

A process for imparting lubricity to an aqueous drilling fluid used in geological exploration involving: (a) providing an aqueous drilling fluid; (b) providing a lubricant component containing a partial glyceride of predominantly unsaturated fatty acids having from about 16 to 24 carbon atoms; and (c) introducing the partial glyceride into the aqueous drilling fluid.

12 Claims, 2 Drawing Sheets

FOREIGN PATENT DOCUMENTS

| | | |
|---|---|---|
| DE | 196 43 840 | 5/1998 |
| DE | 196 47 598 | 5/1998 |
| EP | 0 324 887 | 7/1989 |
| EP | 0 386 636 | 11/1992 |
| EP | 0 374 672 | 3/1993 |
| EP | 0 386 638 | 3/1993 |
| EP | 0 391 252 | 12/1993 |
| EP | 0 374 671 | 3/1994 |
| EP | 0 472 558 | 9/1994 |
| EP | 0 625 563 | 11/1994 |
| EP | 0 532 570 | 2/1995 |
| EP | 0 652 271 | 5/1995 |
| EP | 0 656 414 | 6/1995 |
| EP | 0 770 661 | 5/1997 |
| EP | 0 535 074 | 8/1997 |
| GB | 2 283 036 | 10/1994 |
| WO | WO 90/14402 | 11/1990 |
| WO | WO95/30818 | 11/1995 |
| WO | WO95/34610 | 12/1995 |
| WO | WO98/22551 | 5/1998 |
| WO | WO98/22552 | 5/1998 |

OTHER PUBLICATIONS

Ward, et al., "Silicate Water Based Muds—A Significant Advance in Water Based Drilling Fluid Technology," pp. 1–17, Prepared for the Conference on the Prevention of Oil Discharge from Drillng Operations, held in public in Aberdeen on Jun. 18–19, 1996 (organized by IBC Technical Services, London).

"Petroleum Oils; Determination of Pour Point," ISO 3016, pp. 1–5, Deutsche Norm, Alleinverkauf der Normen durch Beuth Verlag GmbH, Berlin, (Oct. 1982).

Römpp Chemie Lexikon, $9^{th}$ Edition, vol. 6, p. 4484, Georg Thieme Verlag, Stuttgart, (1992).

George R. Gray and H. C. H. Darley, "Composition and Properties of Oil Well Drilling Fluids", 4th Edition, 1980/81, Gulf Publishing Company Houston (not enclosed–reciting entire book).

Bourgoyne, et al., "Applied Drilling Engineering," Second Printing Society of Petroleum Engineers, Richardson, Texas (USA) (not enclosed–reciting entire handbook).

Boyd et al. "New Base Oil Used in Low–Toxicity Oil Muds," Journal of Petroleum Technology, pp. 137–142, 1985.

Bennett, R.B., "New Drilling Fluid Technology–Mineral Oil Mud," Journal of Petroleum Technology, pp. 975–981, 1984.

* cited by examiner

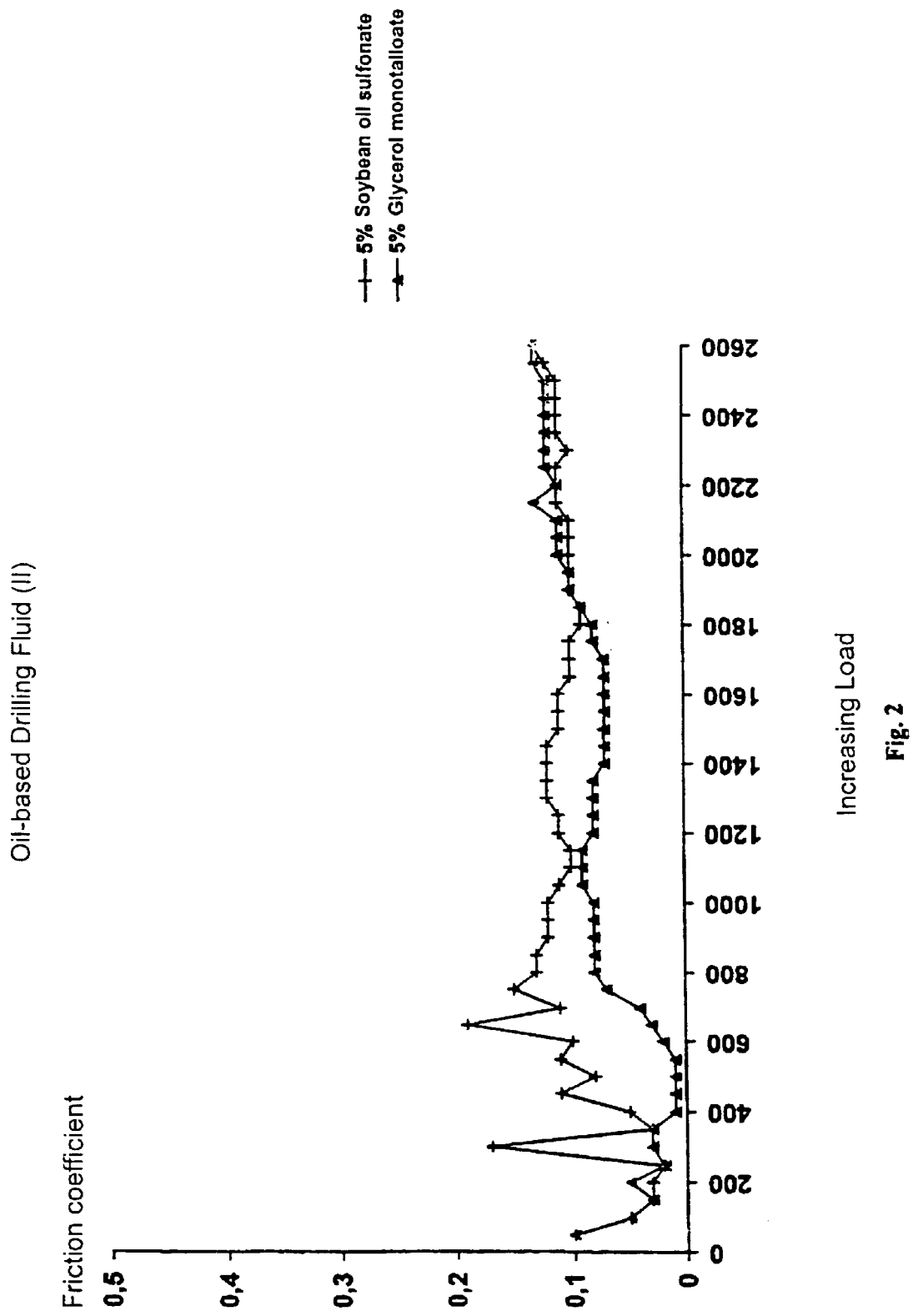

LUBRICANTS FOR DRILLING FLUIDS

BACKGROUND OF THE INVENTION

The present invention relates to the use of partial glycerides as lubricants in drilling fluids for geological exploration.

It is known that drilling fluids for sinking wells in rock and bringing up the rock cuttings are flowable systems thickened to a limited extent which may be assigned to any of the following three classes: purely aqueous drilling fluids, oil-based drilling fluids, which are generally used as so-called invert emulsion fluids, and preparations of the w/o emulsion type in which the aqueous phase is heterogeneously distributed as a fine dispersion in the continuous oil phase. The third class of known drilling fluids is built up on water-based o/w emulsions, i.e. on liquid systems which contain a heterogeneous, finely disperse oil phase in a continuous aqueous phase.

In addition to the basic constituents of a drilling fluid, that is to say water and/or oil, such systems also contain a large number of further constituents which are essential to their performance properties. These include, for example, weighting agents, generally barium sulfate ("barite") which imparts the necessary density to the fluid. Water-soluble salts, generally calcium chloride, are also added in order to prevent an osmotic compensation between the formation water and the drilling fluid. To obtain stable emulsions, suitable emulsifiers are generally also added. Corrosion inhibitors, viscosity-regulating additives, fluid loss additives, alkali reserves and also lubricants may also be present in the fluids.

The class of pure water-based systems is the oldest in the historical development of drilling fluids. However, their use is attended by such serious disadvantages that, hitherto, only limited application has been possible for technically demanding drilling operations. Above all, the interaction of the water-based drilling fluids with the water-sensitive layers of rock—more particularly corresponding layers of clay—to be drilled leads to unacceptable interference with the drilling process.

Very recently, however, a fairly old proposal has been taken up again and, even in highly sensitive shale formations, can lead to adequate stability where purely water-based drilling fluids are used. It involves the use of corresponding systems based on soluble alkali metal silicates which are also known as waterglasses or waterglass-based systems, cf. for example the seminar on "The Prevention of Oil Discharge from Drilling Operations" held in public in Aberdeen on Jun. 18/19, 1996 (organized by IBC Technical Services, London) and, in particular, the publications appearing in this connection by M. Eigner entitled "Field Trials with a Silicate Drilling Fluid in Shell-Expro" and by I. Ward and B. Williamson entitled "Silicate Water Based Muds—a Significant Advance in Water Based Drilling Fluid Technology".

However, the use of purely water-based drilling fluids, particularly of the last-mentioned type, makes the presence of components with a lubricating effect desirable. A large number of lubricants are known for use, in practice. These include mineral oils, animal and vegetable oils and esters. The increasingly stricter regulations with regard to the biodegradability of drilling fluids and their constituents are gradually restricting the use of the otherwise particularly suitable mineral oils. At the same time, there is a growing interest in alternatives with better biodegradability, in particular esters. EP 0 770 661, for example, describes esters of monocarboxylic acids with monohydric alcohols as suitable lubricants for water-based drilling fluid systems. However, only a 2-ethylhexyl oleate is actually mentioned as a suitable lubricant for silicate-containing aqueous fluids. Applicants' DE 196 47 598 describes $C_{12-30}$ fatty alcohols and a mixture thereof with fatty acid esters as suitable lubricants for purely water-based silicate-containing drilling fluids. Triglycerides of fatty acids are also mentioned as esters. It is known that a particularly pronounced lubricating effect is attributed in particular to carboxylic acid esters for the purpose of geological exploration, use being made of this in many ways. However, their use in water-based systems and above all in comparatively highly alkaline waterglass systems can lead to considerable difficulties. Ester cleavage can result in the formation of components with a marked tendency to foam which then introduce unwanted problems into the fluid systems. The above-mentioned publication by I. Ward et al. expressly refers to this difficulty.

Sulfonates of vegetable oils, in particular soya oil sulfonate, are also used as lubricants in practice. Soya oil sulfonate can be used in water- and oil-based systems, but shows significant foaming, especially in water-based fluids, which restricts its usefulness.

Accordingly, the problem addressed by the present invention was to provide a lubricant for both water- and oil-based drilling fluids which would not have the above-mentioned disadvantages. In addition, the lubricant would even be usable at low temperatures which can occur, for example, in drilling fluids that are used and stored in arctic regions. It has now been found that certain selected fatty acid partial glycerides have the desired properties.

BRIEF DESCRIPTION OF THE SEVERAL VIEWS OF THE DRAWING

FIG. 2 is a graph comparing the coefficient of the oil-based fluid (II) without a lubricant and with the lubricant (b)+(c).

DETAILED DESCRIPTION OF THE INVENTION

Figure 1:
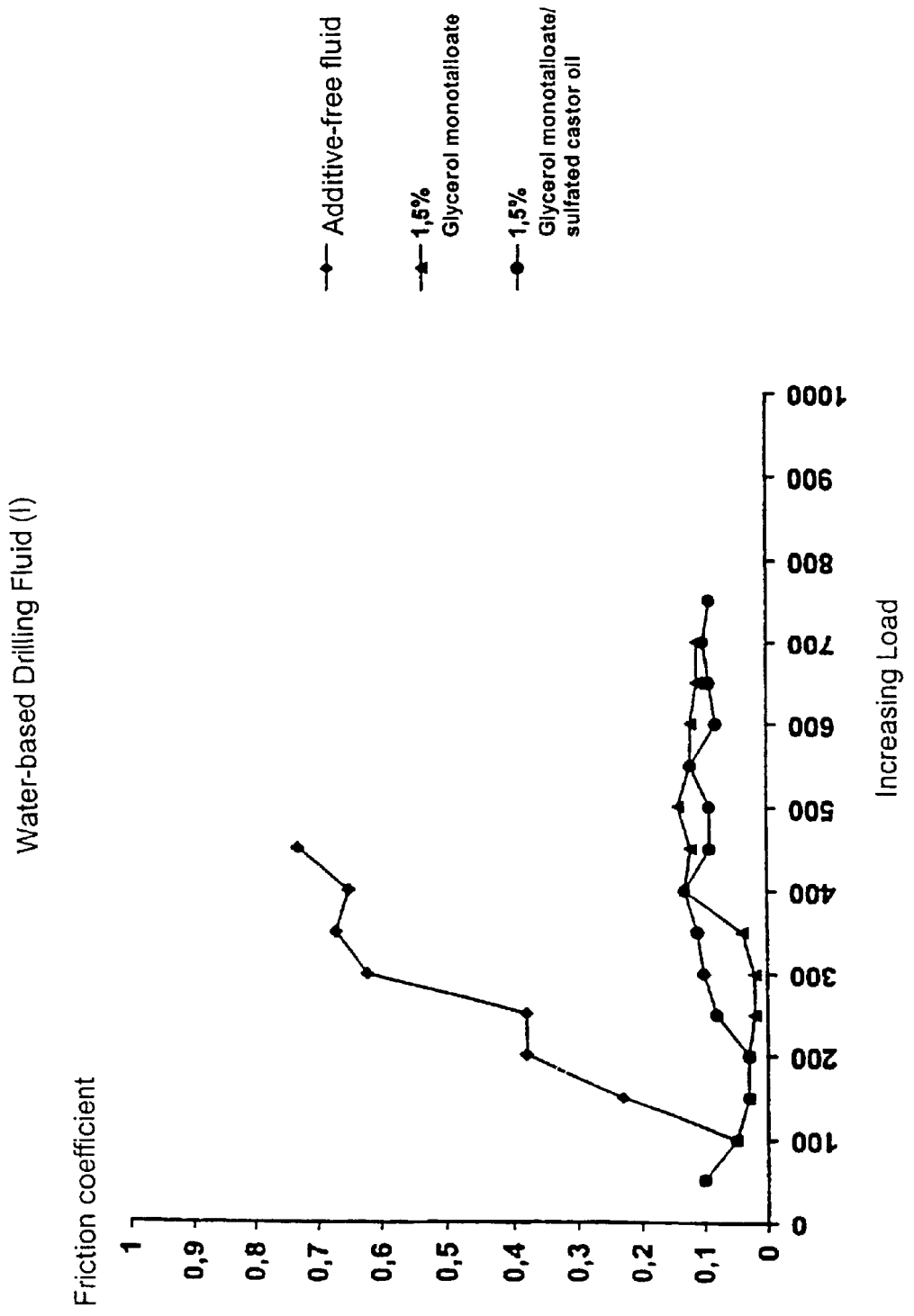
FIG. 1 is a graph comparing the coefficient of the water-based fluid (I) without a lubricant and with the lubricant (b).

In a first embodiment, therefore, the present invention relates to the use of partial glycerides of predominantly unsaturated $C_{16-24}$ fatty acids, optionally in admixture with anionic surfactants, as lubricants in drilling fluids for geological exploration which contain water and optionally a separate oil phase.

It has proved to be advantageous to use partial glycerides which have a pour point—as measured to DIN ISO 3016—of at most 10° C. and preferably at most 0° C.

The lubricants are selected from the partial esters of glycerol with predominantly unsaturated fatty acids containing 16 to 24 carbon atoms. Unsaturated fatty acids are understood to be carboxylic acids which contain at least one olefinically unsaturated double bond in the carbon chain. However, polyunsaturated, in particular di- and tri-unsaturated, fatty acids are also suitable. These are mono- and/or diglycerides of fatty acids or, more particularly, fatty acid mixtures which contain unsaturated fractions to a predominant extent, i.e. more than 50% by weight. Such unsaturated fatty acids are, for example, palmitoleic acid, oleic acid, ricinoleic acid, linoleic acid, linolenic acid or arachidonic acid. Due to the process used for their production, the glycerides are generally not present as pure individual substances, but rather as mixtures of various partial glycerides with different fatty acids. These glycerides may be of natural origin or may be synthesized. Glyceride mixtures which contain at least 50% by weight of monoglycerides are particularly preferred. The percentage content of triglycerides in the partial glycerides used in accordance with the invention is less than 15% by weight, preferably less than 10% by weight and in particular less than 5% by weight.

Mixtures of mono- and diglycerides containing about 40 to 50% by weight of monoglycerides and the same percentage of diglycerides are generally used. The balance to 100% by weight consists of triglyceride.

Depending on the nature of the fatty acid mixture, the partial glycerides may also contain small amounts of saturated fatty acids from the group consisting of saturated $C_{16-24}$ fatty acids. The use of partial glycerides of tall oil fatty acids, a mixture of 45 to 65% by weight of linoleic and conjugated $C_{18}$ fatty acids, 25 to 45% by weight of oleic acid, 5 to 12% by weight of 5,9,12-octadecatrienoic acid and 1 to 3% by weight of saturated fatty acids (according to Römpps Chemie Lexikon, 9th Edition, Volume 6, page 4,484, 1992), is particularly preferred. Tall oil fatty acids are obtained by distillation from tall oil and are then esterified with glycerol on an industrial scale.

According to the invention, the partial glycerides may be used as lubricants both in water-based and in oil-based drilling fluid systems. Water-based systems generally contain only water as the base liquid, preferably more than 90% by volume water. However, they may also contain water-insoluble oils, which form a separate oil phase, in quantities of 1 to 10% by volume. These fluids are then generally present in the form of an oil-in-water emulsion, suitable emulsifiers preferably being used in such cases. In the oil-based systems, the liquid phase of the fluid contains more than 10% by volume of water-insoluble oils. Preferred ratios by volume between oil and water are in the range from 90/10 to 60/40. Systems such as these form water-in-oil emulsions, optionally with the aid of suitable emulsifiers.

The partial glycerides are suitable as a lubricant component both for water-based and for oil-based fluids. In the case of water-based fluids in particular, the use of the partial glycerides leads to significantly reduced foaming which in turn facilitates adjustment of the viscosity and density in practice because, with foaming systems, the accurate measurement and adjustment of density is only possible with difficulty. However, the partial glycerides may also advantageously be used as lubricants in oil-based systems and, here also, lead to a significant reduction in the coefficient of friction, especially under the effect of pressure.

In the process according to the invention, the partial glycerides are added to the drilling fluids in quantities of 0.5 to 5% by weight, based on the drilling fluid as a whole, preferably in quantities of 0.5 to 3% by weight and more preferably in quantities of 1 to 3% by weight. Depending on the particular application and the fluid system, it may be necessary to add more lubricant during the actual drilling operation.

According to the invention, the partial glycerides are used as lubricants in drilling fluids which contain water and optionally a water-insoluble oil in the form of a separate oil phase. This water-insoluble oil is preferably chosen from the group consisting of a) esters of monohydric saturated or unsaturated, linear or branched alcohols containing 1 to 24 carbon atoms and monobasic saturated or unsaturated, linear or branched fatty acids containing 1 to 24 carbon atoms b) mono- and polyhydric, linear or branched alcohols containing 6 to 36 carbon atoms c) mineral oil, diesel oil, paraffin oil d) linear alpha-olefins and derivatives thereof and internal olefins e) carbonic acid esters.

Although mineral and diesel oils and the paraffin oils, particularly those containing 14 to 16 carbon atoms, are well-known oil phases for drilling fluids, ecologically safe alternatives have been increasingly developed in recent years. Because of their ready biodegradability, the esters in particular have become a tried and tested practical alternative to the pure hydrocarbons. Suitable ester oils are described in applicants' European patents EP 0 374 671, EP 0 374 672, EP 0 386 638, EP 0 386 636 and EP 0 535 074 of which the disclosures are also part of the present invention. Certain water-insoluble alcohols are also suitable oils for the drilling fluid systems in question here. Polyhydric, in particular dihydric, alcohols are preferably used. Water-soluble alcohols may also be mixed with water-insoluble solvents, particularly fatty acid esters, and the resulting mixture used as the oil phase. Applicants have described this class of compounds in detail in their European patents EP 0 391 252 and EP 0 472 558. Another group of suitable oils are the linear alpha-olefins and derivatives thereof, in particular poly-alpha-lefins (PAOs). Suitable compounds of this type are described, for example, in the International patent application WO 95/34610. Internal olefins may also be used as oils for the purposes of the present invention. The carbonic acid esters described in Applicants' EP 0 532 570 are also suitable base oils for the drilling fluid systems in question here. In principle, the above-mentioned oils by may be used individually or in admixture. Drilling fluid systems in which ecologically safe base oils, particularly esters or alcohols or mixtures thereof, are used are particularly preferred.

Water-based drilling fluids and the additives to be used therein, such as weighting agents, fluid loss additives, alkali reserves, viscosity regulators and the like, are the subject matter of extensive general literature and relevant patent literature. Detailed technical information can be found, for example, in the book by George R. Gray and H. C. H. Darley entitled "Composition in Properties of Oil Well Drilling Fluids", 4th Edition, 1980/81, Gulf Publishing Company Houston and the extensive technical and patent literature cited therein and in the handbook entitled "Applied Drilling Engineering" by Adam T. Borgoyne, Jr. et al., First Printing Society of Petroleum Engineers, Richardson, Tex. (USA).

The field of water-based silicate fluids also addressed by the teaching according to the invention is also general technical knowledge, cf. in particular the relevant above-mentioned publications. Suitable alkali metal silicates are, in particular, water-soluble sodium silicate and/or water-soluble potassium silicate with modulus values (molar ratio of $SiO_2$ to $Na_2O$ or $K_2O$) of 1.0 to 3.3 and preferably 1.5 to 2.5. Preferred concentrations of the alkali metal silicates in the water-based fluids are at most about 10% by weight, preferably in a somewhat lower range, for example from about 3 to 8% by weight and more particularly in the range from about 4 to 7% by weight. Together with the alkali metal silicates, high concentrations of soluble nonreactive salts are normally intended to be present in the water-based liquid phases. Alkali metal chlorides, especially sodium chloride and/or potassium chloride, are particularly suitable. Correspondingly salt-saturated aqueous silicate fluids are preferred in practice. The pH values of these liquid phases are—comparatively—in the strongly alkaline range and are above pH 10 and more particularly are at least pH 11. It is this class of highly alkaline silicate fluids described here in which the lubricants according to the invention have proved to be particularly effective as an additive in small quantities of, for example, 1 to 3% by weight—based on the fluid as a whole. For the industrial use of these purely water-based systems which has now become interesting again, it is possible to achieve a substantial increase in performance—as is known in principle for the use of components having a lubricating effect in water-based systems—by using very small quantities of organic components selected in accordance with the present invention. The lubricants according to the invention may also be used in water-based fluids containing glycols, particularly ethylene glycol, propylene glycol or butylene glycol and polymers thereof. Such systems—known to the expert as glycol fluids—contain up to 30% by weight of the above-mentioned glycols. The lubricants may also be used in water-based fluids containing silicates and glycols.

Oil-based drilling fluids are generally used as so-called invert emulsion muds which consist of a three-phase system, namely: oil, water and fine-particle solids. These are preparations of the w/o emulsion type, i.e. the aqueous phase is heterogeneously distributed as a fine dispersion in the continuous oil phase. Various additives are present for stabilizing the system as a whole and for establishing the desired performance properties including, in particular, emulsifiers or emulsifier systems, weighting agents, fluid loss additives, alkali reserves, viscosity regulators and the like. Relevant particulars can be found, for example, in the articles by P. A. Boyd et al. entitled "New Base Oil Used in Low-toxicity Oil Muds", Journal of Petroleum Technology, 1985, 137 to 142 and by R. B. Bennett entitled "New Drilling Fluid Technology—Mineral Oil Mud", Journal of Petroleum Technology, 1984, 975 to 981 and the literature cited therein. Particularly preferred emulsifier systems for use in invert drilling muds are described in DE 196 43 840 of which the disclosure is also part of the present application.

Besides partial glycerides, it has proved to be of advantage to use surface-active compounds from the class of anionic surfactants. The sulfonates and sulfates are of particular importance in his regard. Suitable compounds of this type are, for example, $C_{9-13}$ alkyl benzene sulfonates, olefin sulfates, $C_{12-18}$ alkane sulfates, alpha-sulfofatty acids, alkyl sulfates, alcohol sulfates and ether sulfates and also alkyl sulfosuccinic acids. According to the invention, sulfonates of fatty acids containing 12 to 24 carbon atoms and, more particularly, 12 to 14 carbon atoms are preferably used. Sulfated castor oil is also preferably used as an anionic surfactant. In cases where anionic surfactants are also used, they are employed in quantity ratios of anionic surfactants to partial glycerides of 1:10 to 1:20.

The use of selected partial glycerides in drilling fluids in accordance with the invention leads to reduced friction both in water-based and in oil-based systems. No harmful foaming occurs in water-based drilling fluids. The partial glycerides may also be used at low temperatures and are biodegradable. In addition, the partial glycerides used in accordance with the invention are not toxic in aquatic systems.

EXAMPLES

In the following Examples, the lubricating effect of water- and oil-based drilling fluids under various pressures was measured by the Almen-Wieland test.

The following drilling fluid systems (I) and (II) were tested:

| (I) Water-based fluid | | (II) Oil-based fluid (o/w ratio 75/25) | |
|---|---|---|---|
| Water | 4 l | Mineral oil | 675 ml |
| XC polymer | 20 g | Water | 225 ml |
| Bentonite | 56 g | $CaCl_2$ | 95 g |
| CMC LVT | 40 g | Emulsifier | 35 g |
| Barite | 1,755 g | Fluid loss additive | 10 g |
| | | Viscosifier | 25 g |
| | | Lime | 17 g |
| | | Barite | 360 g |

1.5% by weight of lubricant was added to each of the fluids. The following lubricants were investigated:

a) soya oil sulfonate
b) glycerol monotalloate (pour point: −15° C., saponification value: 155, acid value: 1, iodine value: 120, OH value: 255)
c) a combination of glycerol monotalloate with sulfated castor oil.

The graphs in FIG. 1 show the coefficient of friction of the water-based fluid (I) under various pressures. A fluid with no lubricant ("blank mud") was investigated for comparison. It can be seen that the use of partial glycerides b) in accordance with the invention leads to very good lubricating properties of the fluid, especially in the lower pressure range. At the same time, the fluids according to the invention generate hardly any foam.

The graphs in FIG. 2 show the test results for the oil-based fluid (II) against the lubricant-free fluid and a combination of b) with c). It can again be seen that the use of partial glycerides leads to a significant reduction in friction.

What is claimed is:

1. A process for imparting lubricity to an aqueous drilling fluid used in geological exploration comprising:
    (a) providing an aqueous drilling fluid;
    (b) providing a lubricant component containing a partial glyceride derived from a tall oil fatty acid; and
    (c) introducing the partial glyceride into the aqueous drilling fluid.

2. The process of claim 1 wherein the partial glyceride has a pour point of up to 10° C.

3. The process of claim 1 wherein the partial glyceride has a pour point of up to 0° C.

4. The process of claim 1 wherein from about 0.5 to 5% by weight of the lubricant component, based on the weight of the drilling fluid, is introduced into the drilling fluid.

5. The process of claim 1 wherein the drilling fluid contains in excess of 90% by weight, based on the weight of the drilling fluid, of water.

6. The process of claim 1 wherein the drilling fluid contains in excess of 10% by weight, based on the weight of the drilling fluid, of a water-insoluble oil.

7. The process of claim 1 wherein the partial glyceride contains less than about 15% by weight, based on the weight of partial glyceride, of triglycerides.

8. The process of claim 1 wherein the partial glyceride contains less than about 5% by weight, based on the weight of partial glyceride, of triglycerides.

9. The process of claim 1 wherein from about 1 to 3% by weight of the lubricant component, based on the weight of the drilling fluid, is introduced into the drilling fluid.

10. The process of claim 1 wherein the lubricant component further comprises an anionic surfactant.

11. The process of claim 10 wherein the anionic surfactant is selected from the group consisting of sulfonates, sulfates, and mixtures thereof.

12. The process of claim 10 wherein the anionic surfactant and the partial glyceride are employed in a ratio by weight of from about 1:10 to 1:20.

* * * * *